US011157615B2

(12) United States Patent
Timashev et al.

(10) Patent No.: US 11,157,615 B2
(45) Date of Patent: Oct. 26, 2021

(54) MALWARE SCANNING OF AN IMAGE LEVEL BACKUP

(71) Applicant: VEEAM SOFTWARE AG, Baar (CH)

(72) Inventors: Ratmir Timashev, Baar (CH); Anton Gostev, Saint-Petersburg (RU)

(73) Assignee: Veeam Software AG, Baar (CH)

( * ) Notice: Subject to any disclaimer, the term of this patent is extended or adjusted under 35 U.S.C. 154(b) by 0 days.

(21) Appl. No.: 16/380,016

(22) Filed: Apr. 10, 2019

(65) Prior Publication Data
US 2020/0065487 A1 Feb. 27, 2020

Related U.S. Application Data

(60) Provisional application No. 62/657,133, filed on Apr. 13, 2018.

(51) Int. Cl.
| | |
|---|---|
| *G06F 21/56* | (2013.01) |
| *G06F 16/188* | (2019.01) |
| *G06F 9/455* | (2018.01) |
| *G06F 11/14* | (2006.01) |

(52) U.S. Cl.
CPC ........ *G06F 21/561* (2013.01); *G06F 9/45558* (2013.01); *G06F 11/1469* (2013.01); *G06F 16/188* (2019.01); *G06F 2009/45587* (2013.01); *G06F 2201/815* (2013.01); *G06F 2221/034* (2013.01)

(58) Field of Classification Search
CPC ............. G06F 9/45558; G06F 11/1448; G06F 11/1469; G06F 21/56; G06F 21/561; G06F 21/568; G06F 16/188; G06F 2221/034; G06F 2009/45587; G06F 2201/815

USPC .......................................................... 726/24
See application file for complete search history.

(56) References Cited

U.S. PATENT DOCUMENTS

| | | | |
|---|---|---|---|
| 5,257,376 A * | 10/1993 | Beck ..................... | G06F 9/4411 713/1 |
| 7,437,764 B1 | 10/2008 | Sobel et al. | |
| 8,011,010 B2 * | 8/2011 | Michael ............... | G06F 21/562 726/24 |
| 9,268,689 B1 | 2/2016 | Chen et al. | |
| 9,300,692 B2 * | 3/2016 | Beard ..................... | H04L 63/20 |

(Continued)

OTHER PUBLICATIONS

International Search Report and Written Opinion directed to related International Patent Application No. PCT/IB/2019/053039, dated Sep. 25, 2019; 11pages.

*Primary Examiner* — Benjamin A Kaplan
(74) *Attorney, Agent, or Firm* — Sterne, Kessler, Goldstein & Fox P.L.L.C.

(57) ABSTRACT

Scanning a virtual disk image for malware without fully extracting the virtual disk image is described herein. An embodiment operates by receiving a selection of a virtual disk image. Virtual storage is initialized based on the virtual disk image. An appliance is launched, and the appliance is configured to access the virtual disk image via the virtual storage. The virtual disk image is scanned for malware using an anti-virus program such that the virtual disk image does not have to be fully extracted. During scanning, on-the-fly decompression, de-deduplication, decryption, and other operations are performed to translate read requests for content on the virtual disk image into raw disk data for the antivirus program.

27 Claims, 5 Drawing Sheets

(56) References Cited

U.S. PATENT DOCUMENTS 10,719,486 B1 * 7/2020 Buchman ................ G06F 16/11
2011/0196842 A1 8/2011 Timashev et al.

* cited by examiner

MALWARE SCANNING OF AN IMAGE LEVEL BACKUP

CROSS-REFERENCE TO RELATED APPLICATIONS

The present application claims the benefit of provisional U.S. Patent Application No. 62/657,133, titled "Malware Scanning Of An Image Level Backup" and filed on Apr. 13, 2018, which is incorporated herein by reference in its entirety. The present application is also related to U.S. patent application Ser. No. 14/021,312, filed Feb. 4, 2011, now U.S. Pat. No. 9,015,129, and U.S. patent application Ser. No. 13/185,036, filed Jul. 18, 2011, now U.S. Pat. No. 8,566,640, both of which are herein incorporated by reference in their entireties.

TECHNICAL FIELD

The present application is related to malware scanning. In particular, the present application relates to methods, systems, and computer program products for checking a virtual disk image from an image level backup for malware without fully extracting the virtual disk image, and restoring data from the virtual disk image to a target computer.

BACKGROUND

A system administrator often needs to restore a virtual disk image from an image level backup to a computer. For example, the system administrator may want to restore the image level backup to a server because data on the server has been lost or corrupted. The system administrator may use the virtual disk image to restore the server to a previous state in time such as before the data was lost or corrupted.

The system administrator may also want to check a virtual disk image from an image level backup for malware such as computer viruses, worms, Trojan horses, ransomware, spyware, adware, and scareware prior to restoring the image level backup. This is because the system administrator does not want to infect the restored computer with malware. The system administrator may want to perform this check even if the virtual disk image was made of a computer protected by antivirus software. This is because there may be new antivirus definitions for the antivirus software since the virtual disk image was created. In other words, the antivirus software may now be able to detect previously undetectable malware in the virtual disk image.

Conventional methods for checking a virtual disk image for malware involve first fully extracting the virtual disk image to a target computer. A system administrator may then configure antivirus software to scan the restored computer for malware. But having to fully extract the virtual disk image prior to performing a malware scan is computationally intensive, as well as storage and network intensive. Moreover, having to fully extract the virtual disk image prior to performing a malware scan increases the time needed to find a malware free restore point, thereby increasing the time that the computer that needs to be restored is not operational.

Thus, there is a need for systems and methods that check a virtual disk image from an image level backup for malware without having to first fully extract the virtual disk image. There is also a need for systems and methods that remove malware from the virtual disk image without having to first fully extract the virtual disk image.

SUMMARY

Provided herein are system, apparatus, article of manufacture, method and/or computer program product embodiments, and/or combinations and sub-combinations thereof, for checking a virtual disk image from an image level backup for malware without having to fully extract the virtual disk image. Some embodiments operate to receive a selection of a virtual disk image. Virtual storage is initialized based on the virtual disk image and attached to a hypervisor. A virtual appliance is launched, and the virtual appliance is configured to access the virtual disk image. The virtual disk image is then scanned for malware using an anti-virus program. This scan may be performed without first fully extracting and restoring the virtual disk image to a target computer. This may be advantageous because, otherwise, fully extracting and restoring the virtual disk image to a target computer requires significant free computer disk space, CPU resources and processing time. In addition, users may find this advantageous to avoid loading any malware onto a target computer during restoration of a virtual disk image.

Also described herein are embodiments that use a helper appliance to check a virtual disk image from an image level backup for malware without having to fully extract the virtual disk image. Some embodiments operate to receive a selection of a virtual disk image. Virtual storage is initialized based on the virtual disk image and attached to the helper appliance. The helper appliance is configured to access the virtual disk image. The virtual disk image is then scanned for malware using a anti-virus program. This scan may be performed without first fully extracting and restoring the virtual disk image to a target computer.

Also described herein are embodiments for healing one or more file system objects containing malware detected during a malware scan of a virtual disk image. Some embodiments operate to determine one or more file system objects that contain malware based on the result of scanning a virtual disk image for malware. An antivirus module determines a healing solution for the file system objects that contain malware. The antivirus module then applies the healing solution to the file system objects. During application of the healing solution, the changes being made to the file systems objects that contain malware are initially stored in a changes storage rather than the file system objects themselves. This healing process may be performed without first fully extracting and restoring the virtual disk image to a target computer. This may be advantageous because fully extracting and restoring the virtual disk image to a target computer requires significant free disk space, memory, and processing time. In addition, a user may find this advantageous to remove any malware from a virtual disk image prior to performing a restore.

Also described herein are embodiments for restoring a read only virtual disk image to a target computer. Some embodiments operate by performing this restoration such that subsequent healing changes applied to file systems objects in the read only virtual disk image are incorporated in the restore.

This Summary is provided merely for purposes of illustrating some example embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS/FIGURES

The accompanying drawings are incorporated herein and form a part of the specification.

In the drawings, generally, like reference numbers indicate identical or functionally similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for checking an image level backup for malware without having to fully restore the image level backup. Further provided herein are system, apparatus, device, method and/or computer program product embodiments, and/or combinations and sub-combinations thereof, for removing malware from an image level backup without having to first fully restore the image level backup.

Conventional methods for checking a virtual disk image from an image level backup for malware involve fully extracting the virtual disk image to a target computer. A system administrator may then configure antivirus software to scan the restored computer for malware. But having to fully extract the virtual disk image prior to performing a malware scan may require significant free disk space, memory, and time. This is often because of the large size of a virtual disk image (e.g., greater than one terabyte in size). Thus, it may take hours to extract and copy the contents of the virtual disk image to a target computer. Moreover, having to fully extract the virtual disk image prior to performing a malware scan increases the time needed to get a malware free computer operational. On the other hand, extracting the virtual disk image to the target computer without a malware scan may result in the target computer and any connected computers and associated applications being infected by malware.

Figure 1:
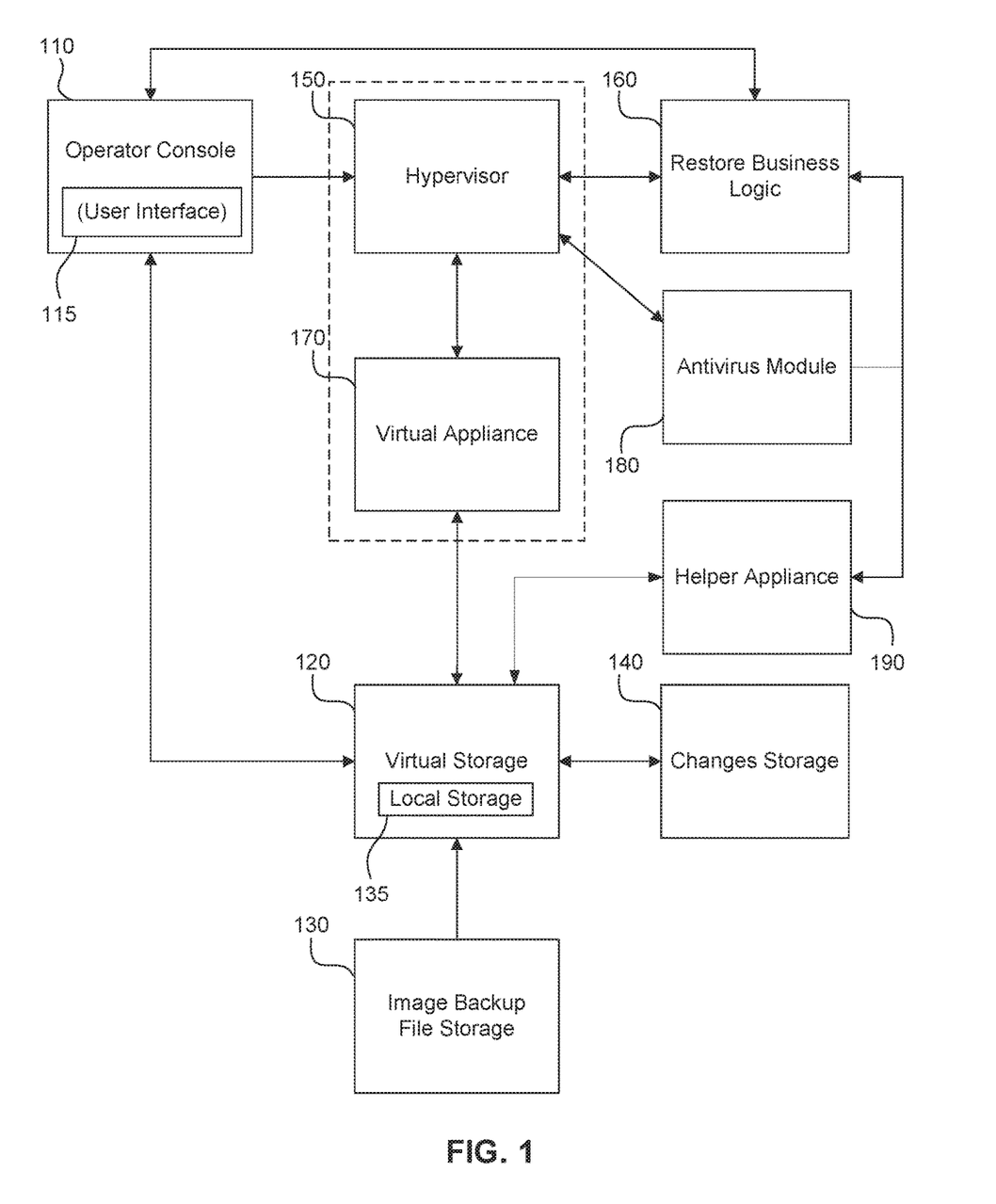
FIG. 1 illustrates a system for checking a virtual disk image from an image level backup for malware without having to fully extract the virtual disk image, according to some embodiments.

FIG. 1 is a block diagram of a system 100 for checking a virtual disk image from an image level backup for malware without having to fully extract the virtual disk image, according to some embodiments. System 100 may include operator console 110, hypervisor 150, virtual appliance 170, virtual storage 120, image backup file storage 130, changes storage 140, restore business logic 160, antivirus module 180, and helper appliance 190.

In some embodiments, antivirus module 180 may be antivirus software that is configured to prevent, detect, and remove malicious software from a computer system. For example, and without limitation, antivirus module 180 can be antivirus software such Norton AntiVirus®, McAfee VirusScan®, Kaspersky Anti-Virus®, or other software programs as would be appreciated by a person of ordinary skill in the art. Antivirus module 180 may prevent, detect, and remove malicious browser helper objects (BHOs), browser hijackers, ransomware, keyloggers, backdoors, rootkits, trojan horses, worms, fraudtools, adware, and spyware from computer system.

Antivirus module 180 may identify malware based on antivirus signature definitions. Antivirus module 180 may identify malware based on behavioral analysis. As would be appreciated by a person of ordinary skill in the art, antivirus module 180 may identify malware using various other methods. Antivirus module 180 may output detected malware results, and may heal file system objects containing detected malware. Antivirus module 180 may do so by deleting the file system objects, and/or by deleting the portions of the file system objects that contain detected malware.

In some embodiments, an operator console 110 includes a user interface (UI) 115 for an operator. UI 115 may be displayed on user input/output device 503 shown in FIG. 5. UI 115 can be used to select a virtual disk image file to scan for malware. The selected virtual disk image can be located in local storage 135 or image backup file storage 130.

In some embodiments, a virtual disk image is a complete image level backup of a computer or server, and may contain the contents and structure of an entire data storage device such as a hard disk drive, tape drive, floppy disk, optical disc, or Universal Serial Bus (USB) flash drive. A virtual disk image may be made by creating a sector-by-sector copy of the source medium. A virtual disk image may replicate the structure and contents of a storage device independent of its file system. A virtual disk image may be based on a standard such as the Virtual Hard Disk (VHD) file format or the Virtual Machine Disk (VMDK) file format. A virtual disk image may be of significant data size because it contains the contents of an entire storage device. A virtual disk image may be highly compressed and de-duplicated to reduce the amount of storage required. A virtual disk image may be encrypted for security reasons.

In some embodiments, virtual storage 120 is a logical storage device that has been abstracted and separated from physical storage, such as network-attached storage (NAS), file servers, disks, and other physical storage devices. Virtual storage 120 may be implemented in the form of a process, a software agent, an application, a virtual machine (VM), hardware, a software appliance, or a combination of hardware and software. Virtual storage 120 may be viewable within system 100 as a storage device containing one or more logical volumes, which are separated from physical storage devices. Virtual storage 120 can be made available to consumers as locally attached storage. Virtual storage 120 can be made available to data consuming processes as remote storage via public or proprietary storage access protocols such as, but not limited to, the Network File System (NFS), Common Internet File System (CIFS), and Internet Small Computer System Interface (iSCSI).

In some embodiments, virtual storage 120 can be configured to represent either the entire or partial raw data content of a virtual disk image file. This makes the entire or partial raw data content of the virtual disk image accessible to data consuming processes. The process of making the entire or partial raw data content of the virtual disk image accessible to data consuming processes is referred to as mounting or publishing the virtual disk image. Virtual storage 120 may represent the mounted virtual disk image as a logical volume.

In some embodiments, operator console 110 uses an appliance (e.g., helper appliance 190 or virtual appliance 170) to read data from a virtual disk image mounted at virtual storage 120. Helper appliance 190 may be a physical computer that runs an operating system (OS) supporting a file system of a restored virtual disk image. In other words, helper appliance 190 may include file system module configured to read a file system of a restored virtual disk image. Helper appliance 190 may include a file system object transfer module enabling helper appliance 190 to restore file system objects from a virtual disk image to a destination computer (e.g., a server where the backup is being restored). The file system object transfer module may be configured to preserve file system object information, such as, but not limited to, timestamps, permissions, and ownership information.

In some other embodiments, operator console 110 uses hypervisor 150 with an image of a specially crafted virtual appliance 170 to read data from a virtual disk image mounted at virtual storage 120. Virtual appliance 170 may be a pre-built and pre-configured computer that runs an OS supporting a file system of a restored virtual disk image. In other words, virtual appliance 170 may include file system module configured to read a file system of a restored virtual disk image. Virtual appliance 170 may be implemented as a virtual machine (VM) running a Linux OS with components that can understand a number of Linux, UNIX, Windows, and other file systems. Virtual appliance 170 may have a minimal set of OS components to make it boot up quickly and keep the appliance size small.

In some embodiments, a VM is a software implementation of a machine such as a server, computer, or other computing device that supports the execution of a complete OS and executes application programs like a physical machine. A VM may duplicate the functionality of a physical machine implemented in hardware and software. Software applications and the OS running on a VM may be limited to the resources and abstractions provided by the VM. In some embodiments, a VM is viewable within an overall virtual infrastructure.

Virtual appliance 170 may include a file system object transfer module enabling virtual appliance 170 to restore file system objects from a virtual disk image to a destination computer (e.g., a server where the backup is being restored). The file system object transfer module may be configured to preserve file system object information, such as, but not limited to, timestamps, permissions, and ownership information.

In some embodiments, hypervisor 150 can be a virtual machine monitor (VMM) such as but not limited to VMWARE™ Player, MICROSOFT™ VirtualPC, SUN™ VirtualBox, VMWARE™ ESX/ESXi, MICROSOFT™ Hyper-V, CITRIX™ XENServer, PARALLELS™. As would be appreciated by a person of ordinary skill in the art, other hypervisors 150 and virtualization solutions can be used as well.

In some embodiments, operator console 110 communicates with helper appliance 190. In some other embodiments, operator console 110 communicates with a virtual environment implemented on hypervisor 150. As would be appreciated by a person of ordinary skill in the art, hypervisor 150 may be implemented as software or a combination of hardware and software to implement platform-virtualization software that allows multiple operating systems (OSs) to run concurrently on a single host computer.

In some embodiments, virtual storage 120 is accessible to helper appliance 190 and hypervisor 150. For example, virtual storage 120 can appear in the form of an NFS server in the case of VMWARE™ ESX hypervisor, or in the form of a CIFS server in the case of MICROSOFT™ HYPER-V hypervisor, to name just two examples.

Helper appliance 190 may support the same storage format as virtual storage 120 is configured to emulate. Helper appliance 190 may perform virtual disk image read operations from virtual storage 120 and write changed virtual disk image data back to virtual storage 120, or directly to changes storage 140. Virtual storage 120 may handle these operations using appropriate formats and may store the modified virtual disk image data on changes storage 140.

Hypervisor 150 may also support the same storage format as virtual storage 120 is configured to emulate. Hypervisor 150 may also perform virtual disk image read operations from virtual storage 120 and write changed virtual disk image data back to virtual storage 120, or directly to changes storage 140.

Virtual storage 120 may store modified virtual disk image data to changes storage 140 when attempting to remove malware from a virtual disk image. Data saved in changes storage 140 may not be saved as persistent data. In some embodiments, helper appliance 190 can read the written data back from changes storage 140 when helper appliance 190 needs to access previously changed data blocks of the virtual disk image. In some other embodiments, hypervisor 150 can read the written data back from changes storage 140 when hypervisor 150 needs to access previously changed data blocks of the virtual disk image. Thus, a virtual disk image file selected from a image level backup may remain read only and intact during the malware removal process.

In some embodiments, changes storage 140 can be implemented as a part of virtual storage 120 using file system level drivers. Changes storage 140 can be implemented as a part of virtual storage 120 by intercepting and re-directing write input/output (I/O) to the designated storage device. Changes storage 140 can also be implemented using native disk I/O redirection capabilities of hypervisor 150 (e.g., snapshots), where data changes created during the malware removal process are redirected to designated storage by hypervisor 150 instead of being committed into the selected virtual disk image file. Changes storage 140 can also be implemented using storage area network (SAN) snapshots.

Virtual storage 120 may use the same virtual disk image file format as stored in the selected virtual disk image. Helper appliance 190 and hypervisor 150 may perform read operations from virtual storage 120 to access data in the virtual disk image. Helper appliance 190 and hypervisor 150 may write changed virtual disk image data into virtual storage 120, or directly to changes storage 140.

Once virtual storage 120 is initialized, commands can be received from operator console 110 via UI 115. An operator can issue a command to configure helper appliance 190 and attach a virtual disk image from virtual storage 120 to helper appliance 190. This may be referred to as mounting or publishing the virtual disk image. The contents of the virtual disk image mounted to helper appliance 190 may be accessible to any program like any other storage device. For example, the contents of the virtual disk image may be accessible as a logical volume at helper appliance 190.

An operator can also issue a command to configure virtual appliance 170 and attach a virtual disk image from virtual storage 120 to virtual appliance 170. Hypervisor 150 may then be used to start up virtual appliance 170 normally. During the boot up of virtual appliance 170, the OS for virtual appliance 170 may automatically mount all discovered file system volumes, including those stored in selected virtual disk images.

Once the boot-up process for virtual appliance 170 ends, virtual appliance 170 may notify operator console 110 via a network broadcast or other communications means. After virtual appliance 170 is booted-up, the contents of the virtual disk image mounted to virtual appliance 170 may be accessible to any program like any other storage device. For example, the contents of the virtual disk image may be accessible as a logical volume at virtual appliance 170.

An operator can issue a command to connect to the running helper appliance 190 or virtual appliance 170 to display, in UI 115, the contents of the file system of the virtual disk image mounted by helper appliance 190 or virtual appliance 170. The operator can select, in UI 115, one or more file system objects in the virtual disk image to scan for malware using antivirus module 180. In some embodiments, the operator may select, in UI 115, some or all file system objects in the mounted virtual disk image for scanning by antivirus module 180.

An operator can issue a command to configure antivirus module 180 to scan selected file system objects in a virtual disk image mounted at helper appliance 190 or virtual appliance 170. The operator may issue the command to configure antivirus module 180 to scan the selected file system objects using an application programming interface (API) of the antivirus module 180. For example, the operator may issue a command to configure antivirus module 180 to scan the selected file system objects via a command line interface. As would be appreciated by a person of ordinary skill in the art, the operator may issue a command to configure antivirus module 180 to scan the selected file system objects using various other APIs.

The operator may also specify one or more scanning parameters to antivirus module 180 that control how antivirus module 180 scans. The operator may specify file system objects to scan. The operator may specify how to output malware detection results. For example, antivirus module 180 may output malware detection results to an operator via UI 115 of operator console 110. The operator may specify that a scan is to be stopped upon encountering a first malware instead of finishing scanning the remaining selected file system objects. This may significantly reduce the time it will take to find the most recent restore point that does not contain malware.

The operator may also specify how to process file system objects containing detected malware. For example, antivirus module 180 may be configured to delete file system objects containing detectable malware. Antivirus module 180 may be configured to heal file system objects containing detectable malware. For example, antivirus module 180 may remove a portion of a file system object that contains malware while preserving the remaining data in the file system object.

According to some embodiments, antivirus module 180 may scan the selected file system objects in the virtual disk image without first fully extracting and restoring the virtual disk image. A user may find this advantageous because, otherwise, fully extracting and restoring the virtual disk image to a target computer requires significant free computer disk space, memory, and processing time. In addition, a user may find this advantageous to avoid loading any malware onto a target computer during restoration of a virtual disk image. The user may instead want to first determine that the virtual disk image does not contain malware, and to remove any detected malware.

Antivirus module 180 may be enabled to scan the selected file system objects without first fully extracting and restoring the virtual disk image because antivirus module 180 accesses the virtual disk image (which is mounted at virtual appliance 170) using virtual storage 120. For example, a data conversion engine of virtual storage 120 may receive a read request from antivirus module 180 for content on the virtual disk image. In response, the data conversion engine may perform on-the-fly (i.e., on-demand) decompression, de-deduplication, decryption, and any other operations required to translate the request for the content on the virtual disk image into raw disk data for antivirus module 180, to perform the malware scan. For example, antivirus module 180 may issue a read request for a file A on the virtual disk image. In response to the request, the data conversion engine of virtual storage 120 may dynamically decompress, de-deduplicate, and decrypt a portion of the virtual disk image to extract only the raw data blocks associated with file A on the virtual disk image.

In some embodiments, once antivirus module 180 completes its scan, the operator may issue a command to configure restore business logic 160 to restore the virtual disk image to a destination server. This may involve restore business logic 160 retrieving each file from the mounted virtual disk image. Where antivirus module 180 heals files in the virtual disk image, restore business logic 160 may retrieve those healed files from the mounted virtual disk image and the corresponding healing changes from changes storage 140. Restore business logic 160 may transfer the retrieved files to a target or destination location (not shown) selected by the operator. The retrieved files can be restored locally to operator console 110, to the original 'source' server, or to another remote server.

In some other embodiments, once antivirus module 180 completes its scan, the operator may issue a command to configure helper appliance 190 or restore business logic 160 to restore one or more file system objects of interest in the virtual disk image to a destination server. In some embodiments, restore business logic 160 may connect to the helper appliance 190 to display, in UI 115, the contents of the file system of the virtual disk image mounted by virtual appliance 170 for the operator. In other some embodiments, restore business logic 160 may connect to the running virtual appliance 170 to display, in UI 115, the contents of the file system of the virtual disk image mounted by virtual appliance 170 for the operator. Restore business logic 160 may then retrieve files selected by the operator in UI 115 of operator console 110 from the mounted virtual disk image. Where antivirus module 180 healed the selected files in the virtual disk image, restore business logic 160 may retrieve the selected files from the mounted virtual disk image and the corresponding healing changes from changes storage 140. The retrieved files may then be transferred to a target or destination location (not shown) selected by the operator. The selected file system object(s) can be restored locally to operator console 110, to the original 'source' server, or to another remote server.

Through virtualization achieved by virtual appliance 170, virtual storage 120, and hypervisor 150, files can be restored to a server with file systems matching the virtual environment used to perform the restore. In this way, system 100 preserves not only the original file contents, but also preserves additional file system object data like permissions and ownership. As would be apparent to one of skill in the art, file system object data can include, but is not limited to directory access right flags such as 'sticky bits' and directory and object level read, write, delete, and execute privileges.

The file and directory level privileges preserved using system 100 can vary between users and groups.

Figure 2:
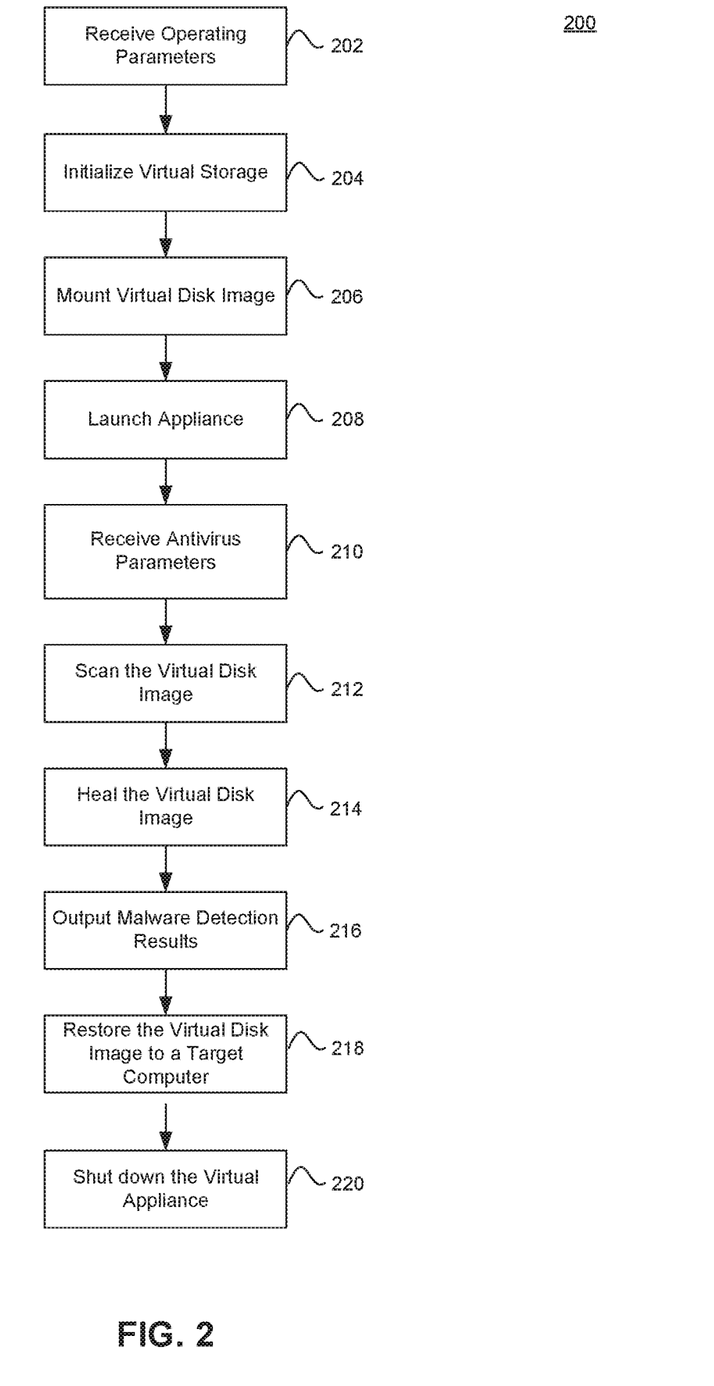
FIG. 2 is a flowchart illustrating a process for checking a virtual disk image for malware without having to fully extract the virtual disk image, according to some embodiments.

FIG. 2 is a flowchart for a method 200 for checking a virtual disk image for malware without having to fully extract the virtual disk image, in accordance with some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to that example embodiment.

In 202, system 100 receives operating parameters for scanning a virtual disk image for malware. The operating parameters may include a selection of a virtual disk image. The selection of the virtual disk image may include a file location of the virtual disk image. System 100 may receive operating parameters at operator console 110 via UI 115 from a user.

In 204, system 100 initializes virtual storage 120. In some embodiments, operator console 110 initializes virtual storage 120 by starting a storage service or a process.

In some embodiments, virtual storage 120 presents the contents of a virtual disk image via a data conversion engine that performs on-the-fly (i.e., on-demand) decompression, de-deduplication, decryption, and any other operations required to translate content of the virtual disk image into raw disk data for an external process to access the virtual storage 120. For example, the data conversion engine of virtual storage 120 may receive a read request from antivirus module 180 for a content structure of the virtual disk image. In response, the data conversion engine of virtual storage 120 may perform on-the-fly decompression, de-deduplication, decryption, and any other operations required to translate the request for the content structure on the virtual disk image into raw disk data for processing by the antivirus module 180. Similarly, the data conversion engine of virtual storage 120 may receive a read request from antivirus module 180 for content on the virtual disk image. In response, the data conversion engine may perform on-the-fly decompression, de-deduplication, decryption, and any other operations required to translate the request for the content on the virtual disk image into raw disk data for processing by the antivirus module 180. For example, antivirus module 180 may issue a read request for a file A on the virtual disk image. In response to the request, the data conversion engine of virtual storage 120 may dynamically decompress, de-deduplicate, and decrypt a portion of the virtual disk image to extract only the raw data blocks associated with file A on the virtual disk image. Such operation by the data conversion engine greatly reduces the free disk space, memory, and computational requirements for scanning a virtual disk image for malware. This is the case, because instead of extracting the entire virtual disk image, only requested data blocks are extracted, and only at the time they are requested (e.g., on-the-fly and as-needed).

In some embodiments, the virtual image remains read-only during the malware scan, which is performed later in method 200. While the virtual image is read-only, changes being made to data in the virtual disk image due to disk write operations (or other operations) are redirected to temporary storage using native hypervisor 150 functionality. Alternatively, while the virtual image is read-only, changes being made to data in the virtual disk image are redirected to available storage using virtual storage 120 (e.g., where helper appliance 190 mounts the virtual disk image or hypervisor 150 lacks functionality to redirect changes to the virtual disk image).

In 206, system 100 mounts the virtual disk image selected in 202. The virtual disk image may be mounted at helper appliance 190 appliance 190 or virtual appliance 170. In some embodiments where the virtual disk image is mounted at helper appliance 190, helper appliance 190 is configured so that it has a logical volume that refers to the corresponding virtual disk image on virtual storage 120. An operator, using operator console 110, mounts or attaches the selected virtual disk image from virtual storage 120 to helper appliance 190 by issuing corresponding configuration commands to helper appliance 190. The virtual disk image may be mounted at helper appliance 190 without making any changes to the virtual disk image. In some embodiments, changes being made to the virtual disk image as part of malware scan or removal (described below) are stored in changes storage 140.

In some other embodiments where the virtual disk image is mounted at virtual appliance 170, virtual appliance 170 is configured so that it has a logical volume that refers to the corresponding virtual disk image on virtual storage 120. An operator, using operator console 110, mounts or attaches the selected virtual disk image from virtual storage 120 to virtual appliance 170 by issuing corresponding hypervisor VM configuration commands. The virtual disk image may be mounted at virtual appliance 170 without making any changes to the virtual disk image. In some embodiments, changes being made to the virtual disk image as part of malware scan or removal (described below) are stored in changes storage 140.

In 208, system 100 launches an appliance that is configured to access the virtual disk image. In some embodiment, the appliance comprises helper appliance 190. In some other embodiments, the appliance comprises virtual appliance 170.

In some embodiments, once the appliance is booted-up, it is ready to serve object level read requests. At this point in method 200, the virtual disk image has not yet been restored to a target machine. A user may find this advantageous because fully extracting and restoring the virtual disk image to a target computer requires significant free disk space, memory, and processing time. In addition, a user may find this advantageous because they may want to avoid loading any malware onto a target computer during restoration of a virtual disk image. The user may instead want to first determine that the virtual disk image does not contain malware. Accordingly, after the appliance (e.g., helper appliance 190 or virtual appliance 170) is booted-up, a user may configure antivirus module 180 to scan file system objects in the virtual disk image without first fully extracting and restoring the virtual disk image.

In 210, system 100 receives antivirus parameters that configure antivirus module 180 to scan file system objects in the virtual disk image without first fully extracting and restoring the virtual disk image. The antivirus parameters may indicate that the virtual disk image is to be scanned and restored (e.g., scan and restore all files in the virtual disk image). The antivirus parameters may indicate that a boot sector of the virtual disk image is to be scanned for malware.

The antivirus parameters may also identify files of interest to scan for malware. In some embodiments, UI 115 within operator console 110 enables selection of file system objects to be scanned within the virtual disk image by an operator.

This may be performed by configuring antivirus module 180 to connect to the running appliance (e.g., helper appliance 190 or virtual appliance 170) so that it can display the contents of the file system of the virtual disk image of virtual storage 120 mounted in 206. For example, the contents of the logical volume of virtual appliance 170 that corresponds to the virtual disk image may be displayed on operator console 110 in UI 115.

In some embodiments, antivirus module 180 is configured to display the contents of the virtual disk image of virtual storage 120 without having to fully extract, decrypt, or decompress the virtual disk image. For example, a data conversion engine of virtual storage 120 may receive a read request from antivirus module 180 for a content structure of the virtual disk image. In response, the data conversion engine of virtual storage 120 may perform on-the-fly decompression, de-deduplication, decryption, and any other operations required to translate the request for the content structure on the virtual disk image into raw disk data for processing by the antivirus module 180. Antivirus module 180 may display the contents of the virtual disk image based on this raw disk data. Example methods for displaying file system objects from a virtual disk image without fully extracting, decompressing, or decrypting the virtual image are described in U.S. Pat. No. 8,402,309 titled "Systems, Methods, and Computer Program Products for Verification of Image Level Backups", which is incorporated herein by reference in its entirety.

In some embodiments, the antivirus parameters may include a healing solution for files that contain detectable malware. A healing solution may include deleting file system objects containing detectable malware. Also or alternatively, a healing solution may include deleting a portion of a file system object containing detectable malware in order to heal the file system object while preserving its data.

In some embodiments, the antivirus parameters may indicate that a boot sector of the virtual disk image is to be scanned for malware. But the boot sector of the virtual disk image may not be represented as a file system object, and antivirus module 180 may be limited to scanning file system objects of the virtual disk image. As a result, antivirus module 180 may be unable to scan the boot sector of the virtual disk image for malware.

In order to overcome this technical problem, and in response to antivirus parameters indicating that the boot sector of the virtual disk image is to be scanned for malware, the appliance (e.g., helper appliance 190 or virtual appliance 170) may read the boot sector of the virtual disk image mounted at the appliance via the data conversion engine of virtual storage 120. The appliance may then create a temporary file containing the data read from the boot sector of the virtual disk image. The appliance may store the temporary file with the virtual disk image. For example, in some embodiments, the appliance may store the temporary file in changes storage 140. As a result, to antivirus module 180, the temporary file may appear as an ordinary file system object on the virtual disk image. Antivirus module 180 may then scan the temporary file for malware like any other file system object on the virtual disk image.

In 212, antivirus module 180 scans the virtual disk image. The antivirus module 180 may scan the full virtual disk image (e.g., all the file system objects in the virtual disk image) based on the received antivirus parameters. The antivirus module 180 may also scan selected file system objects based on the received antivirus parameters. Antivirus module 180 may perform this scan without first fully extracting and restoring the virtual disk image to a target computer. As discussed, this may be advantageous because fully extracting and restoring the virtual disk image to a target computer requires significant free disk space, memory, and processing time. In addition, a user may find this advantageous because they may want to avoid loading malware onto a target computer during restoration of a virtual disk image.

Antivirus module 180 may scan file system objects in the virtual disk image by issuing read requests of the virtual disk image mounted at the appliance (e.g., helper appliance 190 or virtual appliance 170) via a data conversion engine of virtual storage 120. In response, the data conversion engine may perform on-the-fly decompression, de-deduplication, decryption, and any other operations required to translate the request for the content on the virtual disk image into raw disk data for antivirus module 180. For example, antivirus module 180 may issue a read request for a file A on the virtual disk image. In response to the request, the data conversion engine of virtual storage 120 may dynamically decompress, de-deduplicate, and decrypt a portion of the virtual disk image to extract only the raw data blocks associated with file A on the virtual disk image. Antivirus module 180 may then scan the raw data blocks associated with file A for malware.

In some embodiments, antivirus module 180 can perform the malware scan process using standard file read operations provided by the OS running on virtual appliance 170. The antivirus module 180 can run as a module or process on a remote computer (not shown). Alternatively, antivirus module 180 can execute as a process directly inside virtual appliance 170.

In 214, based on the antivirus parameters, antivirus module 180 may heal one or more file system objects containing malware that was detected during the scan of 212. An example of step 214 is described in FIG. 3 (described below). However, step 214 is not limited to that example embodiment.

In 216, system 100 may output the malware detection results from the scan of the selected virtual disk image for malware. System 100 may output the malware detection results to UI 115 of operator console 110. Also or alternatively, system 100 may output the healing results from the healing of the selected virtual disk image.

In 218, system 100 may restore the selected virtual disk image to a target computer. System 100 may restore healed file system objects associated with the selected virtual disk image to the target computer. An example of step 218 is described in FIG. 4 (described below). However, step 218 is not limited to that example embodiment. In 220, system 100 optionally shuts down and cleans up the configuration of virtual appliance 170. This may include deleting data in changes storage 140.

Figure 3:
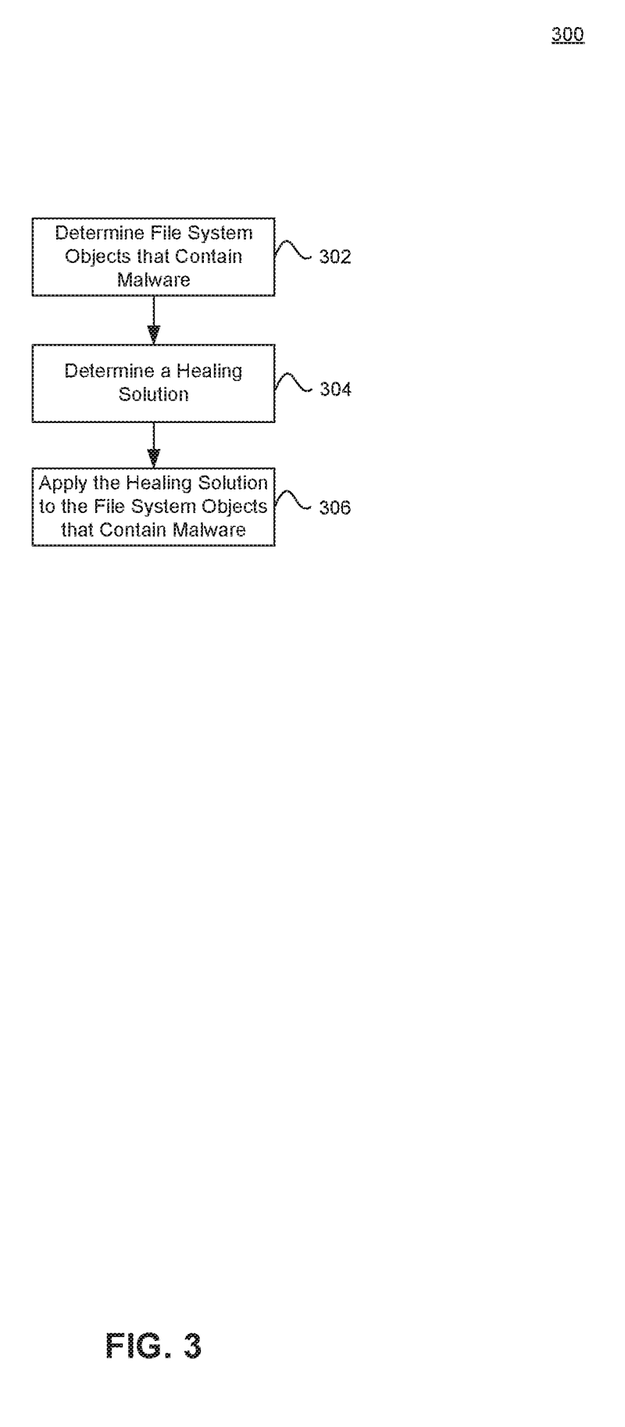
FIG. 3 is a flowchart illustrating a process for healing one or more file system objects containing malware that were detected during an antivirus scan, according to some embodiments.

FIG. 3 is a flowchart for a method 300 for healing one or more file system objects containing malware that was detected during the scan (step 212) in FIG. 2, in accordance with some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to that example embodiment.

In 302, antivirus module 180 determines one or more file system objects that contain malware based on the results of the scan in 212 of FIG. 2. As would be appreciated by a person of ordinary skill in the art, the results of the scan may be based on antivirus module 180 using antivirus signatures, behavioral analysis, or various other detection strategies.

In 304, antivirus module 180 determines a healing solution to apply to the one or more file system objects that contain detectable malware. Antivirus module 180 may determine the healing solution to apply based on the antivirus parameters received in 210 in FIG. 2. A healing solution may include deleting file system objects containing detectable malware. Alternatively, a healing solution may include deleting a portion of a file system object containing detectable malware in order to heal the file system object while preserving its data. Thus, antivirus module 180 may heal a file system object by writing changes to the file system object.

In 306, antivirus module 180 applies a healing solution to one or more file system objects that contain malware. But antivirus module 180 may be unable to write the changes associated with healing the file system objects directly to the associated virtual disk image. This is because the virtual disk image may be read only. Instead, when antivirus module 180 attempts to write the changes associated with healing the file system objects to the associated virtual disk image, the changes are stored in changes storage 140.

In some embodiments, changes storage 140 can be implemented as a part of virtual storage 120 using file system level drivers. For example, when antivirus module 180 attempts to write the changes associated with healing the file system objects to the associated virtual disk image, virtual storage 120 intercepts and re-directs the write input/output (I/O) associated with the changes to changes storage 140.

In some other embodiments, changes storage 140 can be implemented as using native disk I/O redirection capabilities of hypervisor 150. For example, when antivirus module 180 attempts to write the changes associated with healing the file system objects to the associated virtual disk image, hypervisor 150 re-directs the write input/output (I/O) associated with the changes to changes storage 140.

As would be appreciated by a person of ordinary skill in the art, an external process (e.g., restoration business logic 160) may transparently read back the healed file system objects associated with the virtual disk image. This process is discussed in FIG. 4.

Figure 4:
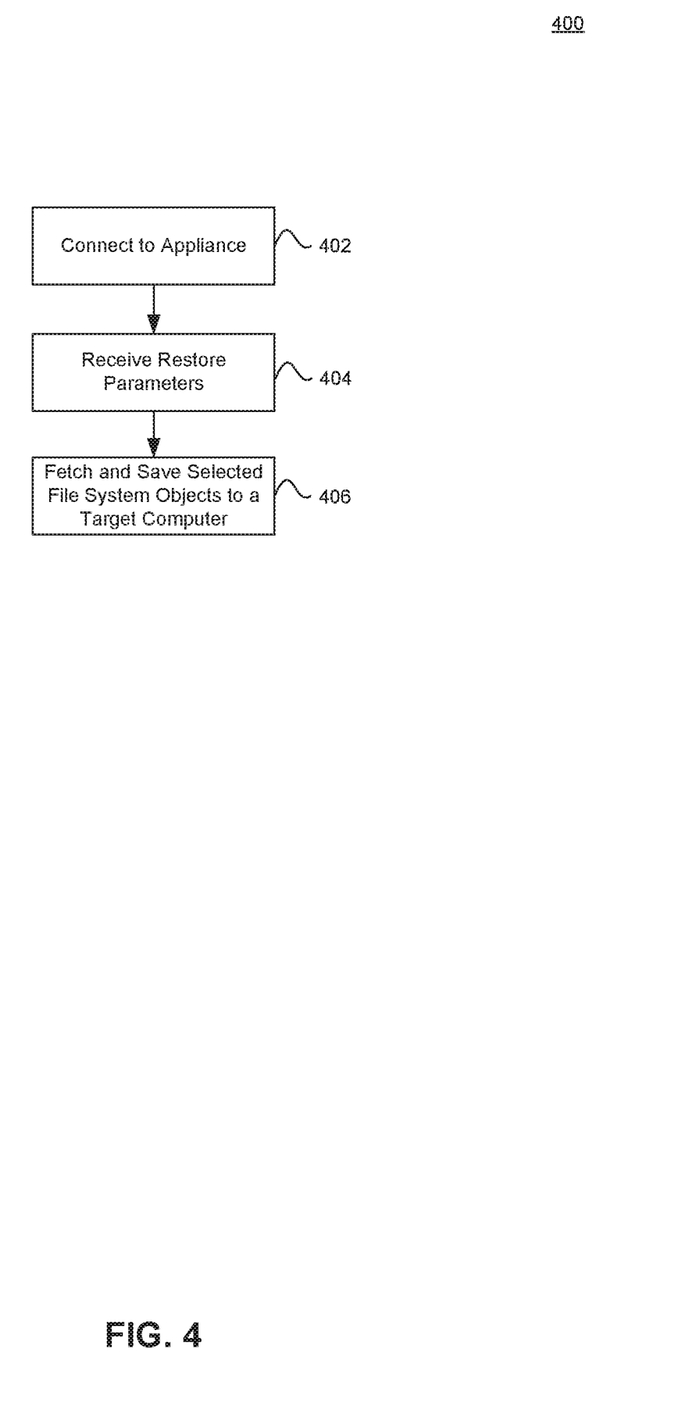
FIG. 4 is a flowchart illustrating a process for restoring a selected virtual disk image, including any healed file systems objects associated with a virtual disk image, to a target computer, according to some embodiments.

FIG. 4 is a flowchart for a method 400 for restoring a selected virtual disk image, including any healed file systems objects associated with the virtual disk image, to a target computer, in accordance with some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 1. However, method 400 is not limited to that example embodiment.

In 402, restore business logic 160 connects to the running appliance (e.g., helper appliance 190 or virtual appliance 170). In some embodiments, in response to connecting, restore business logic 160 may display the contents of the selected virtual disk image attached to the running appliance in step 206 to a restore operator. Restore business logic 160 may display the contents of the selected virtual disk image without having to fully extract, decrypt, or decompress the virtual disk image. For example, the data conversion engine of virtual storage 120 may receive a read request from restore business logic 160 for a content structure of the virtual disk image. In response, the data conversion engine of virtual storage 120 may perform on-the-fly decompression, de-deduplication, decryption, and any other operations required to translate the request for the content structure on the virtual disk image into raw disk data for restore business logic 160. Restore business logic 160 may display the contents of the selected virtual disk image based on the raw disk data. Example methods for displaying file system objects from a virtual disk image without fully extracting, decompressing, or decrypting the virtual disk image are described in U.S. Pat. No. 8,402,309 titled "Systems, Methods, and Computer Program Products for Verification of Image Level Backups", which is incorporated herein by reference in its entirety.

In 404, restore business logic 160 receives restore parameters. The restore parameters may include file system objects to restore. In some embodiments, a restore operator may select file system objects to restore from the displayed contents of the selected virtual disk image in UI 115. In some other embodiments, where the whole virtual disk image is to be restored, restore business logic 160 may select all file system objects from the virtual disk image. Restore business logic 160 may receive additional restore parameters such as location(s) for saving the restored file system objects (e.g., a target computer) and recovery settings (e.g., whether to copy file and directory permissions).

In 406, restore business logic 160 fetches the selected file system objects to be restored and saves the file system objects to a target computer such as a location specified by the restore parameters. Restore business logic 160, however, may not fetch the temporary file representing the boot sector of the virtual disk image created in 210. This is because the virtual disk image may not represent the boot sector as a file system object.

In some embodiments, where the whole virtual disk image is to be restored, restore business logic 160 may fetch all file system objects from the virtual disk image. Restore business logic 160 may fetch the file system objects from the virtual disk image without fully extracting the virtual disk image. For example, restore business logic 160 may issue a read request for a file A on the virtual disk image. In response to the request, the data conversion engine of virtual storage 120 may dynamically decompress, de-deduplicate, and decrypt a portion of the virtual disk image to extract only the raw data blocks associated with file A on the virtual disk image. Example methods for restoring the virtual disk image without fully extracting, decompressing, or decrypting the virtual disk image are described in U.S. Pat. No. 9,015,129 titled "Cross-Platform Object Level Restoration From Image Level-Backups", which is incorporated herein by reference in its entirety.

Additionally, restore business logic 160 may fetch the selected file system objects to be restored along with any changes made to the file system objects since the virtual disk image was mounted to virtual appliance 170 in step 206. For example, restore business logic 160 may fetch the selected file system objects along with the healed changes applied to them by antivirus module 180. This process of fetching modified file system objects may be done transparently. For example, in response to restore business logic 160 fetching a file system object from the selected virtual disk image, hypervisor 150 may check whether the file system object has been modified since the virtual disk image was mounted to virtual appliance 170. If so, hypervisor 150 may re-direct the read request from restore business logic 160 to changes storage 140. Restore business logic 160 may then fetch the modified version of the selected file system object from changes storage 140. If the file system object has not been modified, hypervisor 150 may direct the read request from restore business logic 160 to virtual storage 120. Restore business logic 160 may then fetch the unmodified version of the selected file system object from virtual storage 120.

Alternatively, in response to restore business logic 160 fetching a file system object from the selected virtual disk image, virtual storage 120 may check whether the file system object has been modified since the virtual disk image was mounted to virtual appliance 170. If so, virtual storage 120 may re-direct the read request from restore business logic 160 to changes storage 140. Restore business logic 160 may then fetch the modified version of the selected file system object from changes storage 140. If the file system object has not been modified, virtual storage 120 may handle the read request from restore business logic 160 directly. Restore business logic 160 may then fetch the unmodified version of the selected file system object from virtual storage 120.

As part of fetching, restore business logic 160 may copy the selected file system objects (e.g., unmodified or modified) to the target computer. For example, restore business logic 160 may copy the selected file system objects using a file system object transfer of the virtual appliance 170 to the target computer or host.

EXAMPLE COMPUTER SYSTEM IMPLEMENTATION

Figure 5:
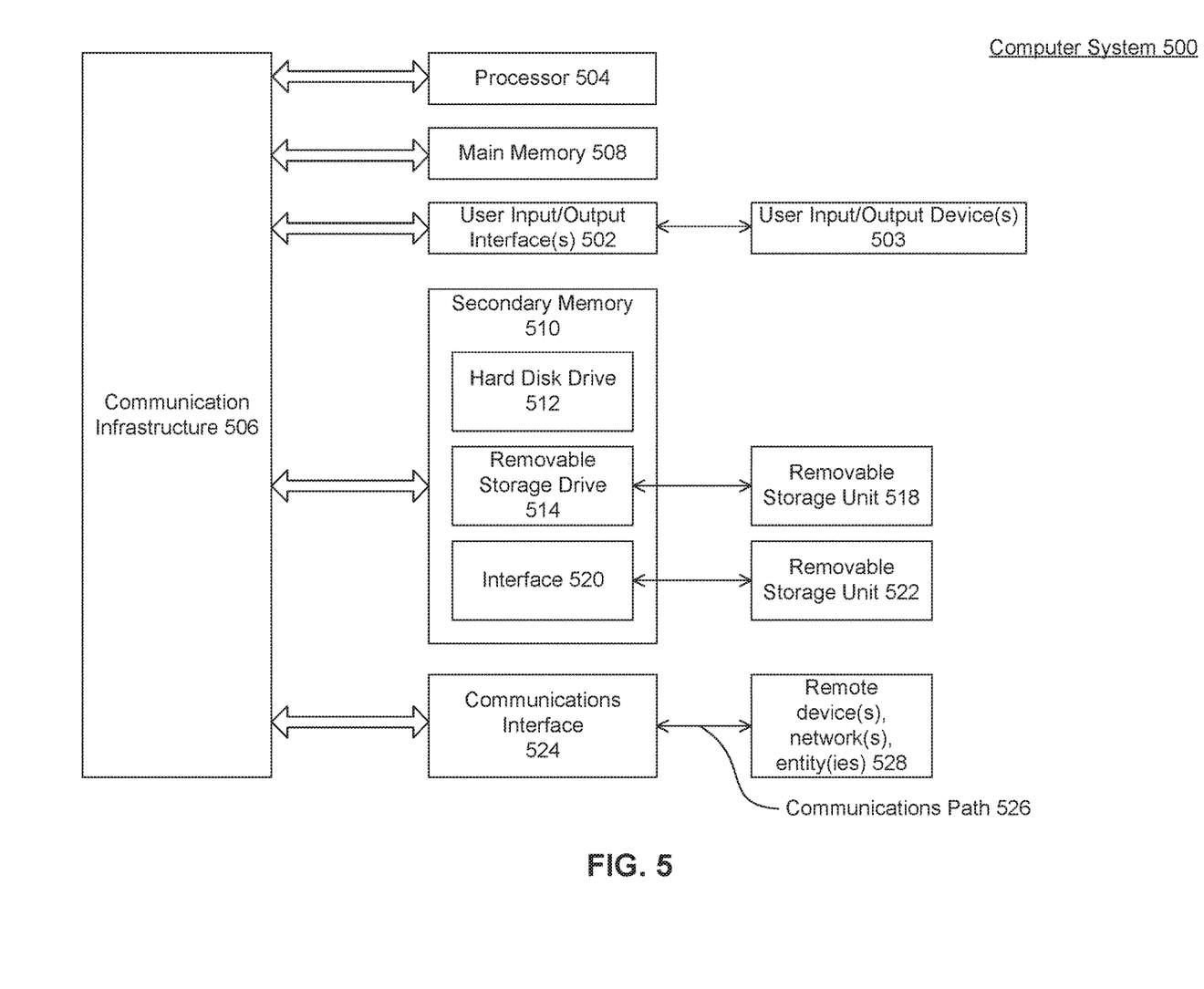
FIG. 5 depicts an example computer system in which embodiments of this disclosure may be implemented.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for scanning an unrestored virtual disk image for malware without fully extracting the virtual disk image, comprising:
receiving a selection of the virtual disk image;
initializing a virtual storage associated with the virtual disk image, wherein the virtual storage comprises a data conversion engine configured to read raw disk data from the virtual disk image, and the virtual storage is configured to write a change to the virtual disk image to a changes storage communicatively coupled to the virtual storage;
launching an appliance communicatively coupled to the virtual storage, wherein the appliance comprises a file system module configured to access one or more file system objects of the virtual disk image via the data conversion engine of the virtual storage;
reading, using the data conversion engine of the virtual storage, a boot sector of the virtual disk image;
creating a temporary file containing the boot sector of the virtual disk image in the changes storage; and
scanning, via the file system module, the one or more file system objects of the virtual disk image for malware using an anti-virus program, wherein the one or more file system objects comprise the temporary file containing the boot sector of the virtual disk image.

2. The method of claim 1, wherein the appliance is a helper appliance, and the helper appliance is a physical computer.

3. The method of claim 1, further comprising:
attaching the virtual storage to a hypervisor communicatively coupled to the appliance, wherein the appliance is a virtual appliance.

4. The method of claim 1, wherein the receiving is performed using an operator console, the operator console being compatible with a first operating system (OS) and a first file system, the virtual disk image being compatible with a second file system, and wherein the first OS does not support the second file system of the virtual disk image.

5. The method of claim 1, wherein the virtual storage performs on-the-fly decompression, de-deduplication, or decryption to translate content of the virtual disk image into the raw disk data.

6. The method of claim 1, further comprising:
determining a content structure of the virtual disk image; and
receiving a selection of a file system object in the content structure of the virtual disk image.

7. The method of claim 6, the scanning further comprising:
scanning the file system object in the content structure of the virtual disk image for malware using the anti-virus program.

8. The method of claim 7, further comprising:
determining the file system object contains malware based on the scanning; and
modifying the file system object using the anti-virus program, wherein the modifying removes the malware from the file system object, and wherein changes to the file system object resulting from the modifying are stored in the changes storage.

9. The method of claim 8, wherein a hypervisor has disk input output (I/O) re-direction capabilities, and the changes storage is implemented using the hypervisor disk I/O re-direction capabilities.

10. The method of claim 7, further comprising:
determining the file system object does not contain malware based on the scanning; and
copying, by a file system object transfer module of the appliance, the file system object from the virtual disk image to a destination host specified by restoration parameters.

11. The method of claim 1, further comprising:
receiving an anti-virus parameter for the anti-virus program, wherein the anti-virus parameter indicates that the boot sector of the virtual disk image is to be scanned for malware.

12. A system for scanning an unrestored virtual disk image for malware without fully extracting the virtual disk image, comprising:
a memory; and
at least one processor coupled to the memory and configured to:
receive a selection of the virtual disk image;
initialize a virtual storage associated with the virtual disk image, wherein the virtual storage comprises a data conversion engine configured to read raw disk data from the virtual disk image, and the virtual storage is configured to write a change to the virtual disk image to a changes storage communicatively coupled to the virtual storage;
launch an appliance communicatively coupled to the virtual storage, wherein the appliance comprises a file system module configured to access one or more file system objects of the virtual disk image via the data conversion engine of the virtual storage;
read, using the data conversion engine of the virtual storage, a boot sector of the virtual disk image;
create a temporary file containing the boot sector of the virtual disk image in the changes storage; and
scan, via the file system module, the one or more file system objects of the virtual disk image for malware using an anti-virus program, wherein the one or more file system objects comprise the temporary file containing the boot sector of the virtual disk image.

13. The system of claim 12, wherein the appliance is a helper appliance, and the helper appliance is a physical computer.

14. The system of claim 12, the at least one processor further configured to:
attach the virtual storage to a hypervisor communicatively coupled to the appliance, wherein the appliance is a virtual appliance.

15. The system of claim 12, wherein the virtual storage performs on-the-fly decompression, de-deduplication, or decryption to translate content of the virtual disk image into the raw disk data.

16. The system of claim 12, the at least one processor further configured to:
determine a content structure of the virtual disk image; and
receive a selection of a file system object in the content structure of the virtual disk image.

17. The system of claim 16, wherein to scan, the at least one processor is further configured to:
scan the file system object in the content structure of the virtual disk image for malware using the anti-virus program.

18. The system of claim 17, the at least one processor further configured to:
determine the file system object contains malware based on the scanning; and
modify the file system object using the anti-virus program, wherein the modifying removes the malware from the file system object, and wherein changes to the file system object resulting from the modifying are stored in the changes storage.

19. The system of claim 17, the at least one processor further configured to:
determine the file system object does not contain malware based on the scanning; and
copy the file system object from the virtual disk image to a destination host specified by restoration parameters.

20. A non-transitory computer-readable device having instructions stored thereon that, when executed by at least one computing device, cause the at least one computing device to perform operations for scanning an unrestored virtual disk image for malware without fully extracting the virtual disk image, the operations comprising:
receiving a selection of the virtual disk image;
initializing a virtual storage associated with the virtual disk image, wherein the virtual storage comprises a data conversion engine configured to read raw disk data from the virtual disk image, and the virtual storage is configured to write a change to the virtual disk image to a changes storage communicatively coupled to the virtual storage;
launching an appliance communicatively coupled to the virtual storage, wherein the appliance comprises a file system module configured to access one or more file system objects of the virtual disk image via the data conversion engine of the virtual storage;
reading, using the data conversion engine of the virtual storage, a boot sector of the virtual disk image;
creating a temporary file containing the boot sector of the virtual disk image in the changes storage; and
scanning, via the file system module, the one or more file system objects of the virtual disk image for malware using an anti-virus program, wherein the one or more file system objects comprise the temporary file containing the boot sector of the virtual disk image.

21. The non-transitory computer-readable device of claim 20, wherein the appliance is a helper appliance, and the helper appliance is a physical computer.

22. The non-transitory computer-readable device of claim 20, the operations further comprising:
attaching the virtual storage to a hypervisor communicatively coupled to the appliance, wherein the appliance is a virtual appliance.

23. The non-transitory computer-readable device of claim 20, wherein the virtual storage performs on-the-fly decompression, de-deduplication, or decryption to translate content of the virtual disk image into the raw disk data.

24. The non-transitory computer-readable device of claim 20, the operations further comprising:
determining a content structure of the virtual disk image; and
receiving a selection of a file system object in the content structure of the virtual disk image.

25. The non-transitory computer-readable device of claim 24, the scanning further comprising:

scanning the file system object in the content structure of the virtual disk image for malware using the anti-virus program.

26. The non-transitory computer-readable device of claim 25, the operations further comprising:
   determining the file system object contains malware based on the scanning; and
   modifying the file system object using the anti-virus program, wherein the modifying removes the malware from the file system object, and wherein changes to the file system object resulting from the modifying are stored in the changes storage.

27. The non-transitory computer-readable device of claim 25, the operations further comprising:
   determining the file system object does not contain malware based on the scanning; and
   copying the file system object from the virtual disk image to a destination host specified by restoration parameters.

* * * * *